United States Patent
Recio Fernandez et al.

(10) Patent No.: US 11,149,864 B2
(45) Date of Patent: Oct. 19, 2021

(54) SMART MONOCONTROL CARTRIDGE FOR TAPS, SMART MONOCONTROL TAPS, SMART MANAGEMENT SYSTEM AND METHOD FOR MONOCONTROL TAPS

(71) Applicant: I Components Studio, S.L, Santa Ponça (ES)

(72) Inventors: Diego Recio Fernandez, Santa Ponça (ES); Daniel Lopez Rodriguez, Santa Ponça (ES)

(73) Assignee: I Components Studio, S.L, Santa Ponça (ES)

( * ) Notice: Subject to any disclaimer, the term of this patent is extended or adjusted under 35 U.S.C. 154(b) by 0 days.

(21) Appl. No.: 16/652,047

(22) PCT Filed: Sep. 29, 2017

(86) PCT No.: PCT/ES2017/070641
§ 371 (c)(1),
(2) Date: Mar. 29, 2020

(87) PCT Pub. No.: WO2019/063856
PCT Pub. Date: Apr. 4, 2019

(65) Prior Publication Data
US 2020/0248823 A1 Aug. 6, 2020

(51) Int. Cl.
*F16K 11/078* (2006.01)
*F16K 27/04* (2006.01)
(Continued)

(52) U.S. Cl.
CPC ........ *F16K 11/0787* (2013.01); *F16K 27/045* (2013.01); *F16K 31/605* (2013.01);
(Continued)

(58) Field of Classification Search
CPC .. F16K 11/0787; F16K 37/005; F16K 27/045; F16K 31/605; B01F 15/00207; Y10T 137/9464
(Continued)

(56) References Cited

U.S. PATENT DOCUMENTS 4,773,767 A 9/1988 Coll
5,535,779 A 7/1996 Huang
(Continued)

FOREIGN PATENT DOCUMENTS

EP 1384979 1/2004
WO WO 2019/063856 4/2019

OTHER PUBLICATIONS

International Preliminary Report on Patentability dated Aug. 20, 2019 From the International Preliminary Examining Authority Re. Application No. PCT/ES2017/970641. (8 Pages).
(Continued)

*Primary Examiner* — Michael R Reid

(57) ABSTRACT

The present invention provides a smart monocontrol cartridge for taps, a smart tap that incorporates said cartridge, and a smart system that incorporates said tap, the monocontrol cartridge comprising a based with a lower end, an upper end for coupling to ceramic discs and an intermediate portion in which a recess is defined in which an electronic module is coupled that is configured to house indirect temperature detection means configured to detect the temperature in the mixed water channel and electronic means configured to calculate the real temperature in the mixed water channel based on an indirect temperature detection, the indirect temperature detection means being in data communication with the electronic means; and wherein a flexible cable is coupled between the electronic module and the cam.

20 Claims, 5 Drawing Sheets

(51) Int. Cl.
  *F16K 31/60* (2006.01)
  *F16K 37/00* (2006.01)
  *G01K 13/02* (2021.01)
  *H01H 3/42* (2006.01)

(52) U.S. Cl.
  CPC .......... *F16K 31/607* (2013.01); *F16K 37/005* (2013.01); *G01K 13/02* (2013.01); *H01H 3/42* (2013.01); *G01K 13/026* (2021.01)

(58) Field of Classification Search
  USPC ........................................................ 137/801
  See application file for complete search history.

(56) References Cited

U.S. PATENT DOCUMENTS

| | | |
|---|---|---|
| 2007/0175266 A1 | 8/2007 | Harcourt et al. |
| 2008/0202611 A1 | 8/2008 | Keiper et al. |
| 2015/0247307 A1* | 9/2015 | Reeder .................... E03C 1/055 4/601 |

OTHER PUBLICATIONS

International Search Report and the Written Opinion dated Jun. 22, 2018 From the International Search Authority Re. Application No. PCT/ES2017/970641 and Its Translation of Search Report Into English. (13 Pages).

* cited by examiner

FIG. 7
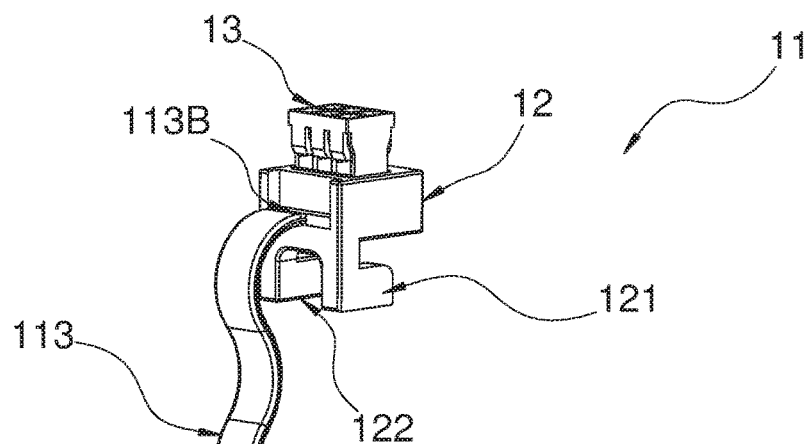
FIG. 7A
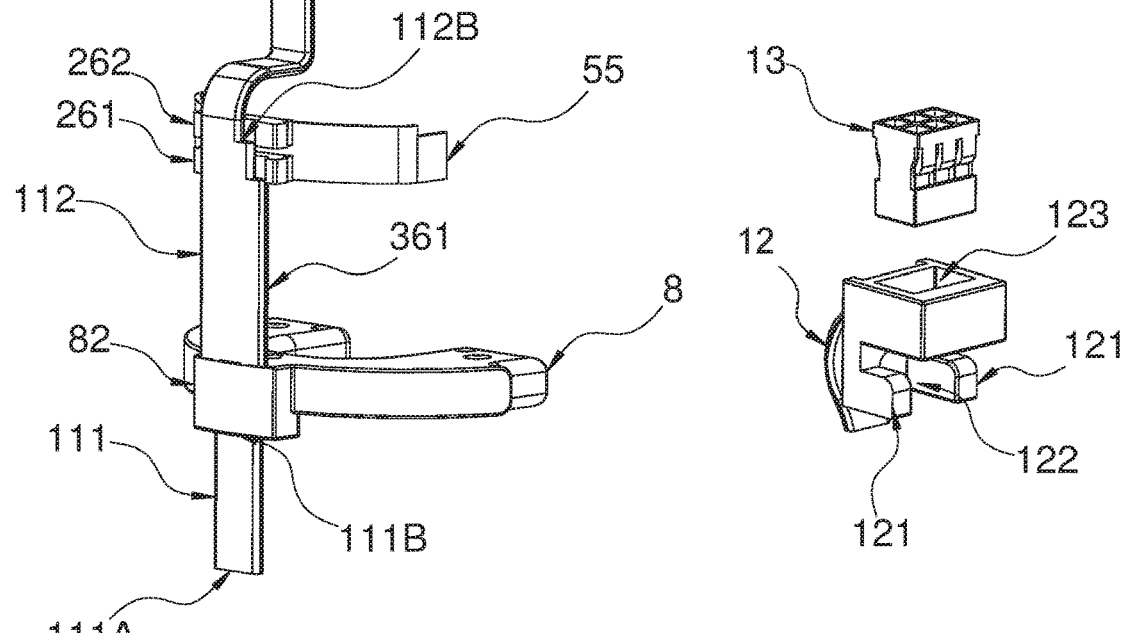
FIG. 8
FIG. 9
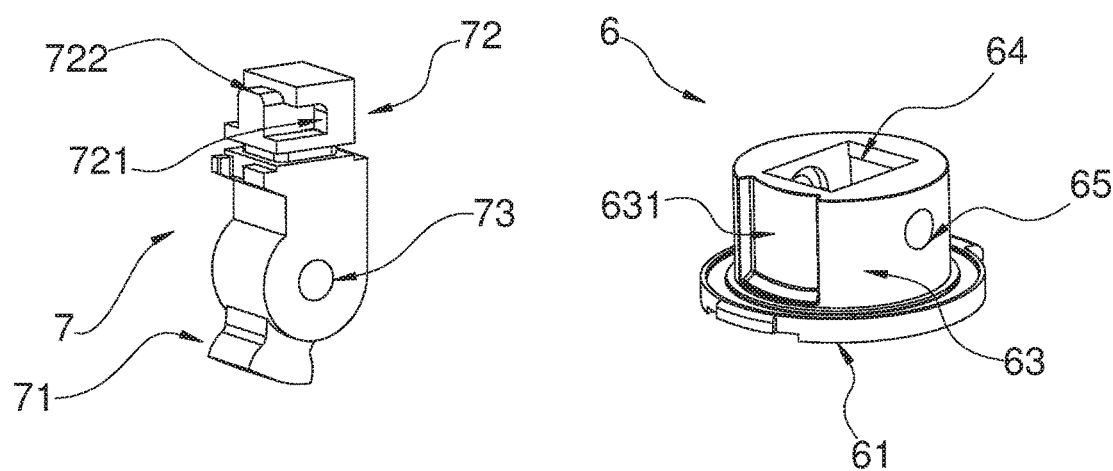

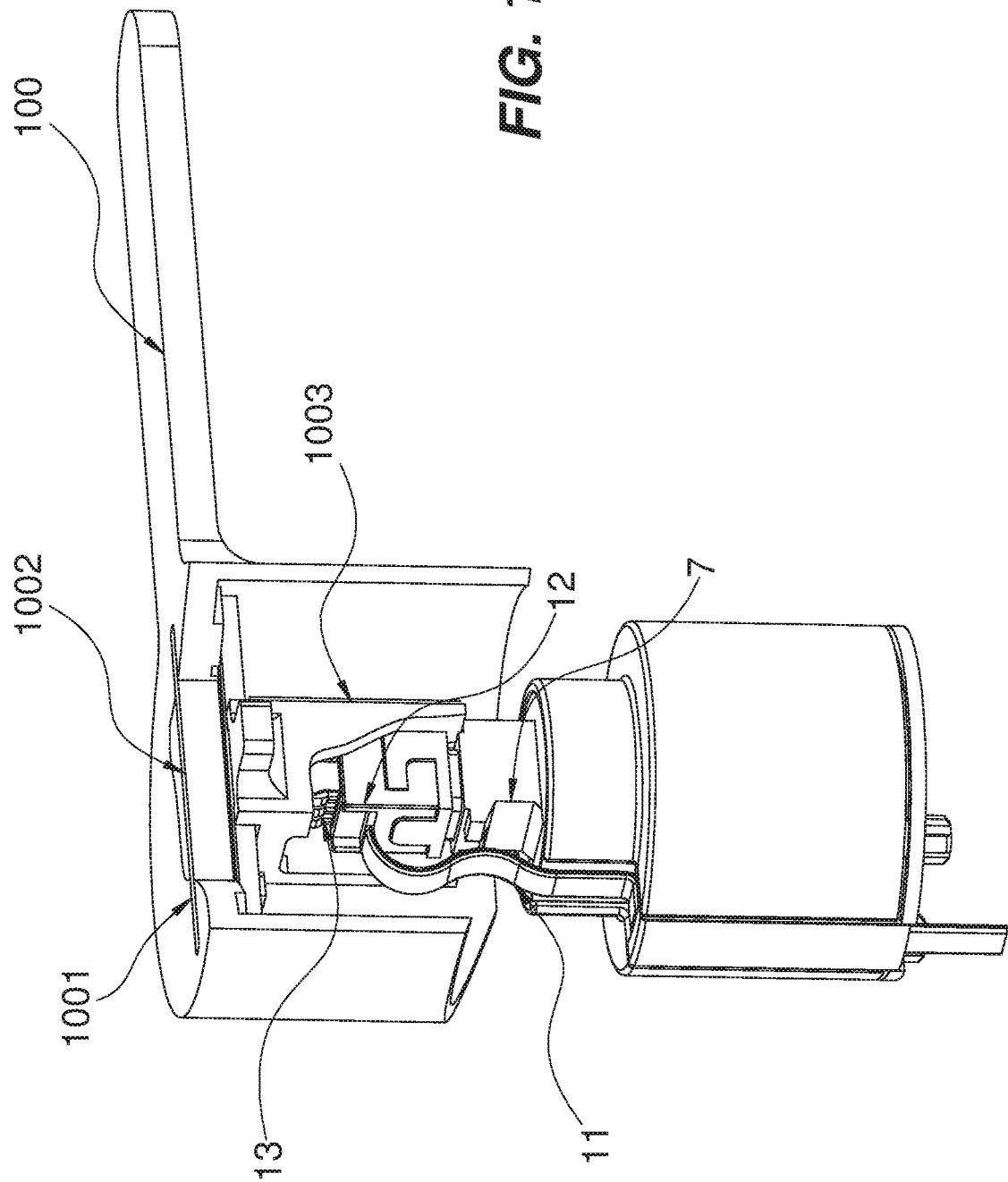

SMART MONOCONTROL CARTRIDGE FOR TAPS, SMART MONOCONTROL TAPS, SMART MANAGEMENT SYSTEM AND METHOD FOR MONOCONTROL TAPS

RELATED APPLICATIONS

This application is a National Phase of PCT Patent Application No. PCT/ES2017/070641 having International filing date of Sep. 29, 2017, the contents of which are incorporated by reference as if fully set forth herein in its entirety.

FIELD AND BACKGROUND OF THE INVENTION

The present invention is related to an accessory for mixing water in taps, particularly with a water-mixing monocontrol cartridge configured to be arranged in monocontrol taps, wherein the cartridge is provided with an electronic part that is capable of generating, processing, transmitting and/or receiving signals so that they can be used by peripheral devices associated to the cartridge.

Currently in the state of the art, there are different individual control taps used in sinks, bath tubs, showers, bidet or similar. These taps generally include an accessory commonly referred to as a cartridge, the latter being designed to mix the water flowing from hot and/or cold water inlets, which are coupled to a chamber or mixing base of the cartridge such that the mixed water is released at the desired temperature. In order to determine the temperature of the mixed water and show a type of warning or information that the temperature of the mixed water corresponds to that of scalding, the individual control accessories of this type can include a temperature indicator operatively coupled to a temperature measurement circuit.

Different configurations have been used to measure and inform the user about the temperature of the mixed water. An example of the state of the art developed to date is the U.S. Pat. No. 5,542,449, which discloses a single-outlet hot/cold water faucet with a water temperature display device with a valve body and a temperature detection and display device where a temperature probe is connected to one end of a detection cable at the opposite end of which is connected to a display. Based on the invention disclosed in this patent, it is noted that the device operates such that when the handle is pushed upwards to open the tap, the switch is turned on to detect the temperature of the water in the mixing chamber by the temperature detection probe and to show the result detected through a liquid crystal display. When the shaft is turned by the handle, the temperature of the mixed water is regulated. If the handle is pressed, the tap is closed and the switch is turned off and, therefore, the temperature detection and display device does not operate.

The main disadvantage of the earlier tap is that the temperature detection probe is in direct contact with the mixed water which means it could prematurely damage the detection probe and increase the possibility of a water leak through the join between said probe and the connecting plate. Moreover, it only indicates that the tap is suitable for indicating the detected temperature on an LCD screen, wherein this screen is activated and deactivated with the position of the tap handle, which means that other types of functions are not considered to be carried out with the electronic part developed in this tap.

Another prior art document that discloses a temperature detection system for water mixed in a monocontrol tap is U.S. Pat. No. 4,682,626, which teaches a monocontrol mixing accessory that has a temperature indicating means electrically coupled to a valve assembly. The monocontrol mixing accessory includes a housing that has cold and hot water passages to which cold and hot water conduits are coupled respectively. A sensor plate is formed having a water outlet opening, and cold and hot water inlet openings, and is mounted thereon in a watertight seal by O-rings. The different valve components are housed in a replaceable cartridge that has a complementary water outlet opening, cold and hot water inlet openings and is mounted on the sensor plate in a watertight seal by O-rings. The temperature measuring circuit is mounted on the sensor plate with the end of the temperature sensor extending through the water outlet opening. The end of the temperature sensor is electrically coupled to the temperature indicator means through the cables and is mounted on the temperature sensor plate. The end of the temperature sensor extends through the radial opening and towards the water outlet opening of the mixing accessory and is mounted in position by means of a retainer which is threaded onto the complementary threaded portion of the opening. The end of the temperature sensor is kept in a watertight seal by O-rings inserted between the thread retainer and the opening. A cap arranged on the handle having an annular recess open at the top. An electronic module is insertable in the recess by snap fit. The electronic module is sealed against said recess by means of a seal ring and covered by a transparent plastic cap. Connecting leads run between the connecting means and the electronic module.

The main disadvantage of the aforementioned prior art is that the sensor plate is an external accessory to the replaceable cartridge, which means that the cartridge itself does not contain the means necessary for detecting the temperature. Thus, in order to carry out all the functionalities described in this prior art, the replaceable cartridge must be linked to the sensor plate, which is inconvenient due to the possibility of water leaks when the sensor plate is coupled to the cartridge. Additionally, the end of the temperature sensor is in direct contact with the mixed water, which damages the sensor and increases the possibility of water leaks through the join between the sensor end and the plate. Moreover, the electronic module is only configured to operate the temperature indicator means, which means that other types of functions cannot be carried out by said electronic module.

The aforementioned prior art discloses tap cartridges or accessories that have mixed water temperature detection means, as well as means that enable the temperature detected to be displayed in order to prevent burns due to a high temperature of the mixed water; however, none of the devices disclosed in the state of the art are prepared to, in addition to measuring the temperature of the mixed water, register and share data related to the operation thereof, or prepared to form part of a smart water management system.

Therefore, there is a clear need to provide a monocontrol cartridge for taps that, having a standard size to be coupled in the body of a tap commonly found on the market without the need for additional accessories, incorporate in the same a module with electronic components to carry out different operations with said electronic components, among which are detecting the real temperature of the mixed water, usage time of the tap associated to the cartridge, amount of water used, etc., as well generating information and sending signals based on said information to visual interfaces arranged in the tap or points external to the tap, and the cartridge simultaneously having the ability to be interconnected and exchange data and actions with a smart water management system.

SUMMARY OF THE INVENTION

In order to provide a solution to the needs found, the present invention provides a smart monocontrol cartridge for taps comprising an outer casing having a lower longitudinal end and an upper longitudinal end and wherein a base coupled to the lower longitudinal end of the casing is housed, the base comprising at least three perforations that respectively define a channel for cold water, a channel for hot water and a channel for mixed water; a pair of ceramic discs, the lower being fixed and the upper being mobile, located above the base, the lower fixed ceramic disc being coupled to the base; a mobile cap arranged above the ceramic discs, coupled to the upper mobile disc and configured to move with respect to the casing; a handle arranged above the mobile cap and coupled at the upper end of the casing; a mobile cam which is coupled in a pivotable way to the handle and operatively connected to the mobile cap and configured to move said mobile cap; wherein the base comprises a lower end, an upper end for coupling to ceramic discs and an intermediate portion in which a recess is defined in which an electronic module is coupled that is configured to house indirect temperature detection means configured to detect the temperature in the mixed water channel and electronic means configured to calculate the real temperature in the mixed water channel based on an indirect temperature detection, the indirect temperature detection means being in data communication with the electronic means; and wherein a flexible cable is coupled between the electronic module and the cam.

In alternative embodiments of the monocontrol cartridge in the intermediate portion of the base, the perforation of the channel for mixed water creates in the recess a channel wall for mixed water, and the electronic module comprises an inner wall configured to be put in operative contact with the wall of the channel for mixed water.

In other embodiments of the invention, the electronic module comprises an inner cavity configured to house the electronic means and the indirect temperature detection means, the electronic means comprising Analogue-Digital conversion means, processing means configured to calculate the real temperature based on the indirect temperature detection and compare said real temperature to a pre-set reference temperature, and communication means configured to transmit the real temperature, said indirect detection means being arranged in the inner wall of the electronic module. Additionally, the electronic module comprises a connection port, wherein said connection port is configured to electrically connect the electronic means to the flexible cable and establish data communication therebetween.

In additional embodiments of the monocontrol cartridge, the mobile cap comprises attachment means configured to couple said mobile cap to said mobile upper disc of the ceramic discs, and additionally comprises an elastic electrical contact. Accordingly, the casing comprises a slot that extends in the longitudinal direction between the lower longitudinal end and the upper longitudinal end of said casing, wherein an electrical contact of the casing is arranged in the slot of the casing and at the height of the mobile cap, the elastic electrical contact of the mobile casing being configured to be put in contact with the electrical contact of the casing by means of the movement of the mobile cap.

In alternative configurations of the invention, the flexible cable comprises a lower section, an intermediate section and an upper section, wherein there is a means for connecting to the connection port of the electronic module between the lower section and the intermediate section, and wherein there is a means for connecting to the electrical contacts of the casing between the intermediate section and the supper section, and wherein there is a connection element in the upper section configured to receive the flexible cable and to couple said flexible cable to the cam, the flexible cable further comprising a plurality of routes configured for the electric power supply and data communication of the cartridge.

In alternative embodiments, the cam is coupled in a pivotable way to the handle by means of a bolt that passes through said cam through a hole, said bolt being fastened in holes arranged in the handle, the pivoting movement of the cam being configured to move the mobile cap, which in turn generates a relative movement between the electrical contacts of the casing and the electrical contact of the mobile cap, thus generating an electrical signal of the position of the mobile cap that is sent to the electronic means of the electronic module through the flexible cable, the processing means being configured to identify the position of the mobile cap based on the electric signal sent to the electronic means of the electronic module. The cam comprises a first lower end configured to be operatively coupled to the mobile cap and a second upper end configured to actuate the cam, wherein said second upper end of the cam comprises coupling means configured to receive the connection element of the upper end of the flexible cable, the connection element comprising a connector electrically linked to the flexible cable.

Alternatively, the flexible cable comprises, at the lower end, a connection member that is configured to receive the flexible cable and to electro-mechanically couple said flexible cable to a connector.

The smart monocontrol cartridge of the present invention is intended to be used in a smart tap via which the flow of a mix of hot and cold water is controlled, the tap having a tap body comprising a base end, an upper end, a projection in which a mixed water outlet end is defined and a cartridge housing wherein the cartridge of the present invention is arranged, said cartridge being configured to receive a flow of cold water through the cold water channel of the base and a flow of hot water through the hot water channel of the base; the tap having a handle arranged at the upper end of the tap body and operatively coupled to the cartridge, the handle comprising a housing wherein an interface element is arranged, which comprises visual means, the interface element being electro-mechanically connected to the flexible cable through the connector of the connection element of the upper end of the cam of the cartridge; a coupling element configured to couple the upper end of the cam of the cartridge, the handle being configured to actuate the cam; and electricity supply means configured to provide energy to the electronic means, the indirect temperature detection means of the cartridge and the interface element.

In alternative embodiments of the smart monocontrol tap, the processing means are configured to calculate, based on the position of the mobile cap, the position of the handle and the opening and/or closing time of the handle, wherein the communication means, through the flexible cable of the cartridge, transmit to the interface element information of the calculation of the real temperature in the mixed water channel, and/or of the calculation of the comparison between the calculated real temperature and pre-set reference temperature, and/or of the position of the handle, and/or of the opening and/or closing time of the handle, wherein the visual means of the interface element are configured to show the information received by the interface element.

In another preferred embodiment, the smart monocontrol cartridge of the present invention is intended to be used in a smart monocontrol tap that controls the flow of a mix of hot and cold water, said tap having a tap body comprising a cartridge housing wherein the cartridge of the present invention is arranged, said cartridge being configured to receive a flow of cold water through the cold water channel of the base and a flow of hot water through the hot water channel of the base; the tap having a handle operatively coupled to the cartridge, the handle comprising a coupling element configured to be coupled to the upper end of the cam of the cartridge; and the tap additionally comprising an interface element in electro-mechanical connection with the cartridge, and electricity supply means configured to provide energy to the electronic means, the indirect temperature detection means of the cartridge and the interface element.

In alternative embodiments of this preferred embodiment, the interface element is arranged in a position along the tap body and/or along the mixed water outlet body and/or in a position external to the tap body and to the mixed water outlet body, the interface element comprising visual means, wherein said visual interface element is electro-mechanically connected to the flexible cable through the connector of the lower connection element of the flexible cable of the cartridge.

In other alternative embodiments of this preferred embodiment, the processing means are configured to calculate, based on the position of the mobile cap, the position of the handle and the opening and/or closing time of the handle, and the communication means, through the flexible cable of the cartridge, transmit to the interface element information of the calculation of the real temperature in the mixed water channel, and/or of the calculation of the comparison between the calculated real temperature and pre-set reference temperature, and/or of the position of the handle, and/or of the opening and/or closing time of the handle, wherein the visual means of the interface element are configured to show the information received by the interface element.

The smart monocontrol cartridge of the present invention is designed to be used in any tap on the market, without having to use the electronic part thereof.

The smart monocontrol cartridge of the invention is also intended to, arranged in a monocontrol tap such as the one disclosed above, form part of a smart management and mixed hot water and cold water delivery system, wherein the system comprises a shutoff solenoid valve intended to be connected to the hot water pipes and/or to the cold water pipes upstream with respect to the monocontrol tap, the solenoid valve being configured to emit an operation signal and/or receive a cut-off signal; a flowmeter intended to be arranged downstream of the cut-off solenoid valve and upstream of the tap, the flowmeter being configured to emit a flow signal, wherein the communication means of the cartridge are configured to receive a flow signal, receive an operation signal and transmit a cut-off signal.

One of the advantages achieved by the present invention is that the cartridge is a standard size and does not require accessories, which means it can be easily incorporated in an existing tap. This is advantageous for a tap manufacturer given that extensive changes to the manufacturing process in order to incorporate the cartridge do not need to be carried out. It is even possible to upgrade a tap that is already arranged for use, given that the cartridge of the present invention could be incorporated into said tap with the handle associated to the same, to thus obtain a smart tap.

Another of the advantages is the indirect measurement of temperature. Given that the indirect temperature detection means are not in direct contact with the mixed water, they are not damaged when in contact with the water, and in addition, there are perforations in the base of the mix in order to communicate said indirect detection means to the mixed water and to the electronic part, which means that while the electronic module is still arranged in the base, it is isolated from the cold, hot and mixed water channel, which guarantees that there will not be any short circuits.

BRIEF DESCRIPTION OF THE SEVERAL VIEWS OF THE DRAWINGS

The previous advantages and characteristics, in addition to others, shall be understood more fully in light of the following detailed description of exemplary embodiments, with reference to the drawings attached, which must be taken by way of illustration and not limitation, wherein:

FIG. 7 is a perspective view of the flexible cable, wherein the electronic module, the electrical contacts of the casing, and the flexible electrical contact of the cap have been left visible in order to see the connection relation of the aforementioned elements with the flexible cable.

FIG. 7A is a detail view of the connection element arranged at the upper end of the flexible cable, wherein a male pin connector is shown in an exploded view.

FIG. 8 is a perspective view of the cam.

FIG. 9 is a perspective view of the handle.

FIG. 10 is a perspective view of an exemplary embodiment wherein the cartridge of the present invention is arranged in a smart tap.

DESCRIPTION OF SPECIFIC EMBODIMENTS OF THE INVENTION

The following detailed description present a number of specific details by way of example to provide a detailed understanding of the relevant teachings. However, it is clear for a person skilled in the art that the present teachings can be carried out without these details.

Figure 1:
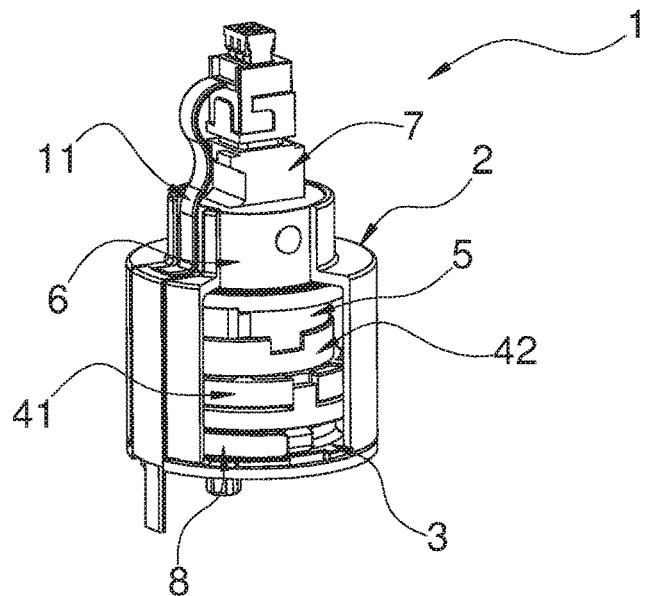
FIG. 1 is a perspective view of the monocontrol cartridge wherein a partial cross section has been made in one of the components in order to show the inner components of the cartridge.
Figure 2:
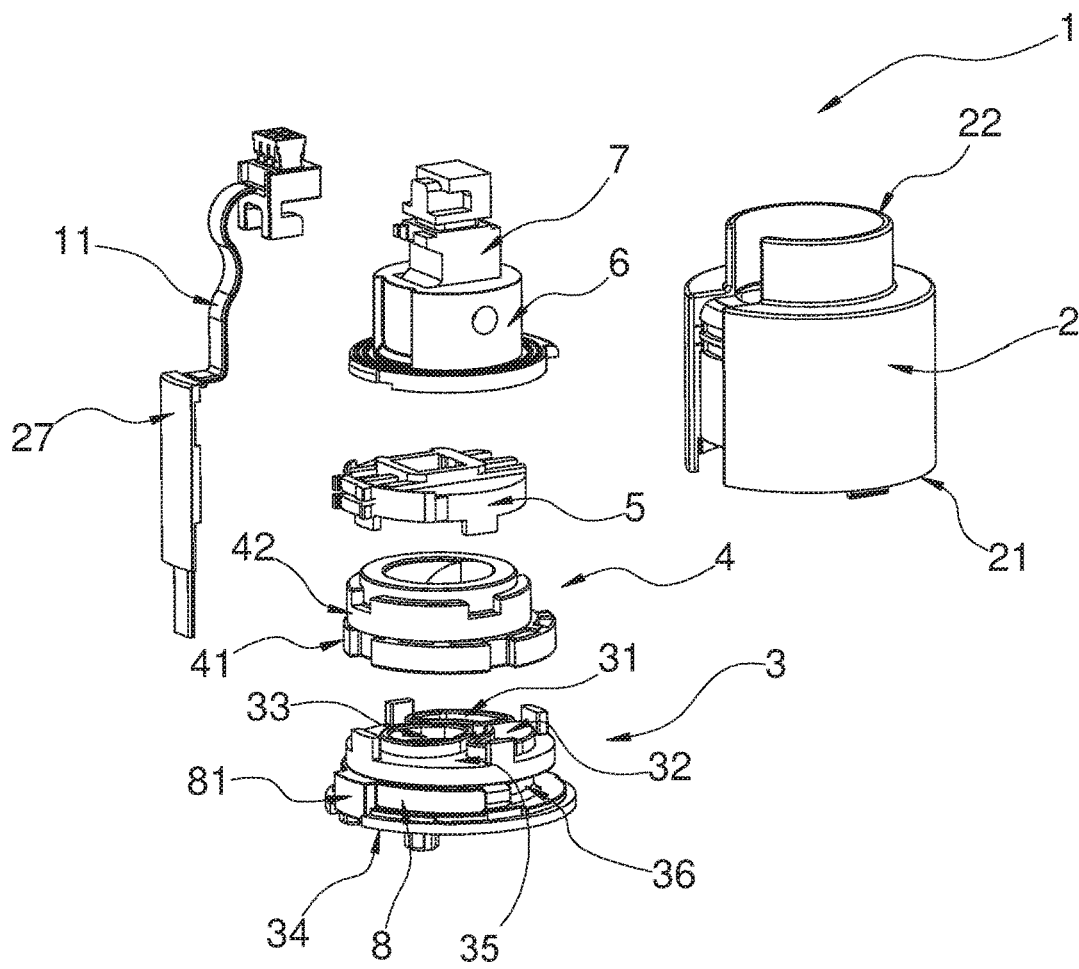
FIG. 2 is an exploded perspective view of the monocontrol cartridge wherein the inner components of the cartridge may be seen separately.

In accordance with a preferred embodiment, and as may be seen in FIGS. 1 and 2, the invention provides a smart monocontrol cartridge (1) for taps comprising a casing (2)

having a lower longitudinal end (21) and an upper longitudinal end (22) and wherein a base (3) coupled to the lower longitudinal end (21) of the casing (2) is housed, the base (3) comprising at least three perforations that respectively define a channel for cold water (31), a channel for hot water (32) and a channel for mixed water (33); a pair of ceramic discs (4), the lower being fixed (41) and the upper being mobile (42), located above the base (3), the lower fixed ceramic disc (41) being coupled to the base (3); a mobile cap (5) arranged above the pair of ceramic discs (4), coupled to the upper mobile disc (42) and configured to move with respect to the casing (2); a handle (6) arranged above the mobile cap (5) and coupled at the upper longitudinal end (22) of the casing (2); a mobile cam (7) which is coupled in a pivotable way to the handle (6) and operatively connected to the mobile cap (5) and configured to move said mobile cap (5); wherein the base (3) comprises a lower end (34), an upper end (35) for coupling to ceramic discs and an intermediate portion (36) in which a recess is defined in which an electronic module (8) is coupled that is configured to house indirect temperature detection means (9) configured to detect the temperature in the mixed water channel (33) and electronic means (10) configured to calculate the real temperature in the mixed water channel (33) based on an indirect temperature detection, the indirect temperature detection means (9) being in data communication with the electronic means (10); and wherein a flexible cable (11) is coupled between the electronic module (8) and the mobile cam (7).

Figure 3:
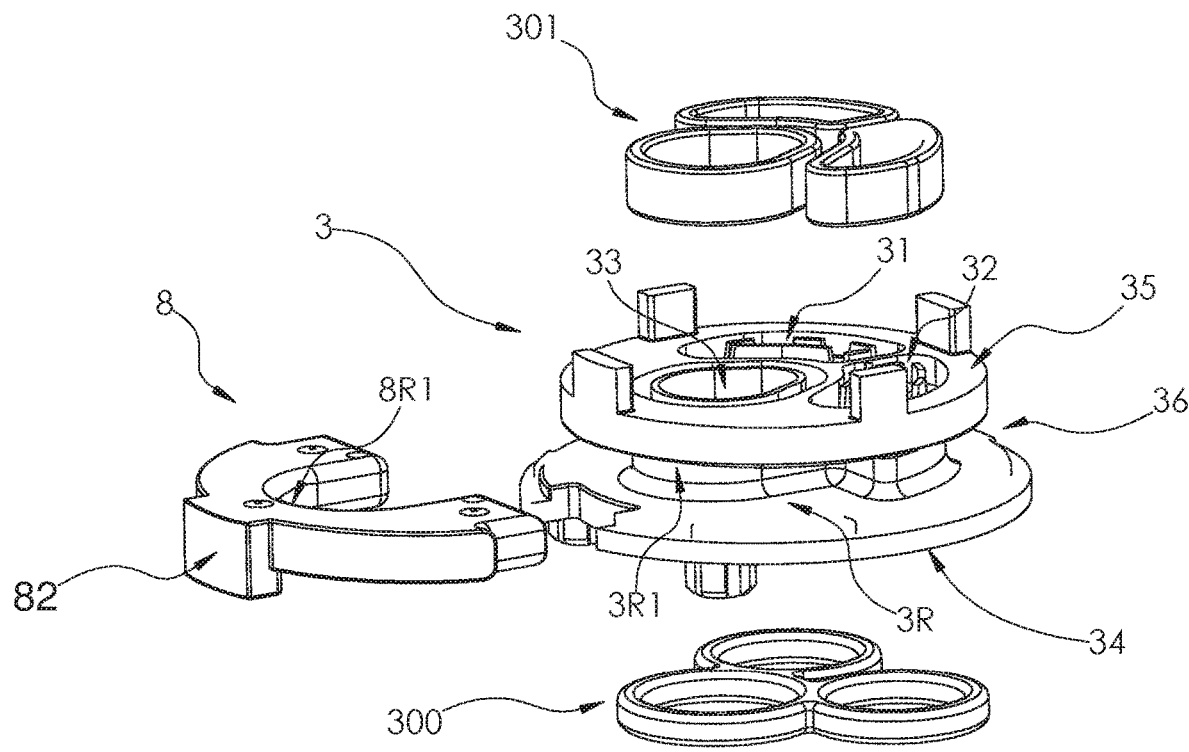
FIG. 3 is an exploded perspective view of the base and the electronic module.

In FIG. 3, the base (3) and electronic module (8) may be seen in greater detail. As mentioned above, the base (3) is coupled at the lower longitudinal end (21) of the casing (2), the base (3) comprising a lower end (34), an upper end (35) for coupling to the pair of ceramic discs (4) and an intermediate portion (36). Unlike the mixing base of conventional cartridges, the base (3) of the cartridge (1) of the present invention has optimised the material necessary to form channels for cold (31), hot (32) and mixed (33) water, eliminating material that is not useful from the intermediate portion (36), being able to create a recess (3R) in said intermediate portion (36) in order to house the electronic module (8) in the base (3). As shall be described below, the electronic module (8) houses in the inside thereof, electronic means (10) (not shown) and indirect temperature detection means (9) (not shown). Integrating the electronic module (8) into the base (3) is an advantage compared to the state of the art since there are not any monocontrol cartridges for electronic taps that regulate temperature and/or flow, these cartridges being directly installable inside a standard monocontrol mechanical tap.

As can be seen in FIG. 3, in the intermediate portion (36) of the base (3), the perforation of the channel for mixed water (33) creates in the recess (3R1) a channel wall for mixed water (33). This wall (3R1) is intended to receive by way of stop and be put into operative contact with an inner wall (8R1) of the electronic module (8). As shall be analysed below, the mixed water in the mixed water channel (33) generates in the wall (3R1) a temperature $T_1$ that largely corresponds to the temperature at which the mixed water is found in the mixed water channel (33). Said temperature $T_1$ is detected by the indirect temperature detection means (9) and is transmitted to the electronic means (10) to be processed. In FIG. 3, it may also be seen that the base (3) has attachment means in the upper part thereof which are configured to couple the lower ceramic disc (41).

Additionally, the base (3) comprises a lower seal (300) and an upper seal (301) around each of the channels for cold (31), hot (32) and mixed (33) water, wherein said upper seal (301) is housed in seal housings in the lower ceramic disc (41) to couple in a sealed manner the base (3) to the pair of ceramic discs (4). These lower (300) and upper (301) seals, as well as the pair of ceramic discs (4), are widely known in the state of the art, and those used in the present invention correspond to standard seals and ceramic discs, which means it is not necessary to explain these components in greater detail.

Figure 4:
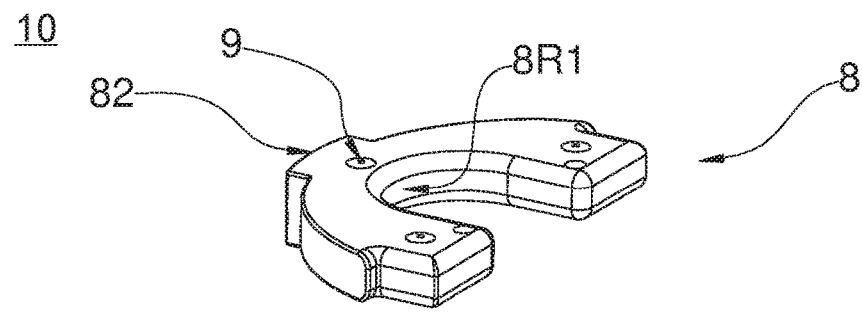
FIG. 4 is a perspective view of the electronic module.

In accordance with what can be seen in FIGS. 3 and 4, the electronic module (8) has been arranged in the base (3) to be as close as possible to the channels for cold (31), hot (32) and mixed (33) water, in particular to be close to the channel for mixed water (33) and thus be able to detect the temperature that the mixed water generates in the wall (3R1) of the base (3). The electronic module (8) is mainly U-shaped and comprises an inner cavity (not shown) that is configured to house the electronic means (10) (not shown) and the indirect temperature detection means (9) (not shown). It is important to highlight that, while the electronic means can be distributed throughout the inner cavity, the indirect temperature detection means (9) are preferably located in the inner wall (8R1). This preferred location for said indirect temperature detection means (9) is, as has been mentioned above, inside the electronic module (8) but at a minimum distance from the wall (3R1) of the mixed water channel (33) of the base (3), that is, the indirect temperature detection means (9) do not come into direct contact with the mixed water, which means that no perforation is made in the mixed water channel (33) to detect or measure the temperature of said mixed water. In this way, an indirect measurement is produced of the temperature of the mixed water in the channel (33), thus eliminating the possibility of leaks or breaks in the seal, which could take place in the case that, as in the prior art, the temperature detection means is completely or partially housed inside the mixed water channel.

In preferred embodiments, the indirect temperature detection means (9) comprise a thermistor, a RTD sensor, a thermocouple, or combinations thereof.

As stated above, the mixed water is at a real temperature $T_R$, which generates in the wall (3R1) a temperature $T_1$ that is essentially the same as the real temperature $T_R$ at which the mixed water in the channel (33) is found. The indirect temperature detection means (9) record a temperature $T_2$, which is slightly lower than the temperature $T1$. In order to obtain the real temperature $T_R$ of the mixed water, a calculation based on the temperature $T_2$ must be carried out. To do so, the indirect temperature detection means (9) are electrically connected and in data communication with the electronic means (10), said electronic means comprising Analogue-Digital conversion means (not shown), processing means (not shown) configured to calculate the real temperature based on the indirect temperature detection and compare said real temperature with a pre-set reference temperature, and communication means (not shown) configured to transmit the real temperature. The Analogue-Digital conversion means are responsible for converting the signal coming from the indirect temperature detection means (9) in order for it to be interpreted by the processing means and, due to the calculation capacity of the latter, an iterative operation is carried out at a set frequency of the value measured by the indirect temperature detection means (9) to obtain the real temperature $T_R$ by means of calculations based on the transfer capacity and thermal inertia of the material of the wall (3R1) of the base (3) and of the lower wall (8R1) of the electronic module (8). An iterative mathematical model is preferably used on the conduction transfer equation $$q_k = -kA\frac{dT}{dX}.$$

Once the real temperature $T_R$ of the mixed water has been calculated, it is then compared to the reference temperature $T_{Ref}$ stored in an internal memory of the processing means. The reference temperature $T_{Ref}$ corresponds to the temperature that can scald skin, that is, the temperature at which hot water can burn the skin of the user, which according to medical standards is above 50° C., that is, when this temperature value is reached, there is a high risk of burning for the user. Therefore, the aim of the comparison is to detect when the temperature of the mixed water in the mixed water channel (33) is close to, has reached, or has exceeded the reference temperature $T_{Ref}$ that corresponds to the scalding temperature, and generate data related to the comparison. Thus, when the smart monocontrol cartridge (1) forms part of a smart tap or a smart management system, as shall be analysed in detail below, it can send the comparison data through the communication means to interface elements or upper processing units, or peripherals, in order to provide the user with warning signals regarding the high temperature of the mixed water, or acting on the peripherals to shut off the flow of water. The electronic means (10), particularly the processing means, have other functions in addition to calculating the real temperature $T_R$ and comparing said temperature with the reference temperature $T_{Ref}$, which shall be described in detail as the other components of the cartridge are described.

Furthermore, and in order to prevent water or humidity entering the electronic means (10), the latter and the indirect temperature detection means (9) are encapsulated in a thermosetting resin that in the cured state generates an adhering surface, which guarantees the durability of the electronic components of the cartridge and that the electronic module (8) can be coupled by friction in the recess (3R) of the intermediate portion (36) of the base (3). This is advantageous since it is not necessary to include another type of fastening means to keep the electronic module (8) coupled to the base (3); however, the person skilled in the art can see that another type of fastening means would fall within the scope of the invention, such as glue, hooks, bolts and/or similar.

In addition, and as may be seen in FIGS. 2 to 4, the electronic module (8) comprises a connection port (82) that is configured to electrically connect the electronic means to the flexible cable (11). The connection of the flexible cable (8) in the connection port (82) shall be described in detail below.

Figure 5:
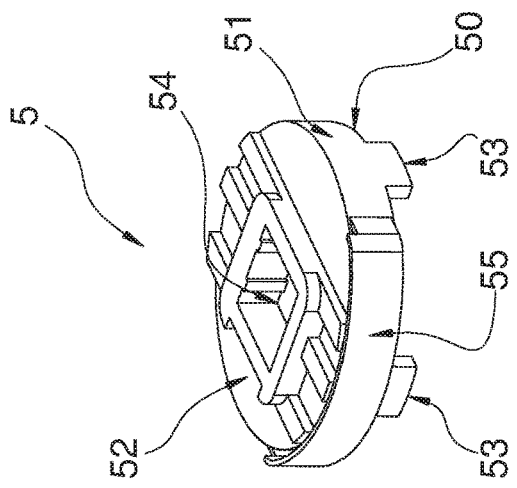
FIG. 5 is a perspective view of the mobile cap, wherein the flexible electrical contact can be seen coupled to said mobile cap.

As can be seen in FIGS. 2 and 5, the mobile cap (5) is essentially a circular disc comprising a lower end (50), a cylindrical portion (51) and an upper end (52). Attachment means (53) are defined in the lower end (50), said attachment means being configured to couple the mobile cap (5) to the mobile upper disc (42) of the pair of ceramic discs (4). The mobile cap (5) further comprises a cavity (54) at the upper end (52) in which the lower end (71) of the cam (7) is housed. Given that the mobile cap (5) is operatively coupled to the cam (7), said mobile cap (5) linearly or angularly moves, or both simultaneously, when the cam (7) is actuated by, for example, a handle of a monocontrol tap. In addition, a flexible electrical contact (55) is arranged on the cylindrical portion (51). For this purpose, contact securing means have been arranged in said cylindrical portion (51) configured so that the flexible electrical contact (55) is kept integral to the mobile cap (5) when it is moved. In preferred embodiments, the contact securing means comprises a perimeter recess in the cylindrical portion (51), although other ways of securing the flexible electrical contact (5) to the cylindrical portion (51) are acceptable, such as bolts or glue. The flexible electrical contact (55) is configured to, based on the position of the mobile cap (5) which in turn depends of the cam (7), be put in contact with electrical contacts (261) (262) that are arranged in the casing (2).

The casing (2) is, as can be seen in FIGS. 1, 2, 6, 6A, an essentially hollow, cylindrical body that has a lower longitudinal end (21) and an upper longitudinal end (22), and has a first section (201) and a second section (202), wherein the first section (201) extends from the lower longitudinal end (21), and the second section (202) extends from the upper longitudinal end (22), the first section (201) having a larger diameter than the second section (202), which creates a change in cross section that creates a shoulder (203) in which said first (201) and second (202) section are joined. As may be seen in FIG. 1, the base (3) is coupled and housed in the first section (201) with respect to the lower longitudinal end (21) of the casing (2).

Figure 6:
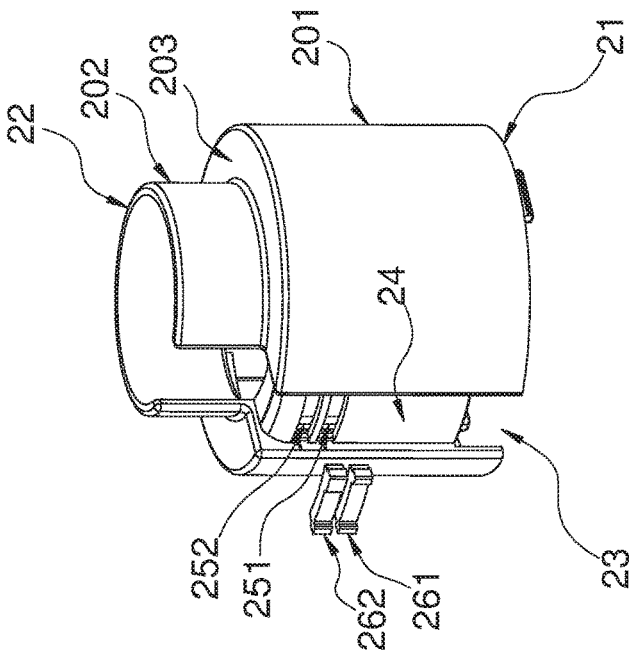
FIG. 6 is an exploded perspective view of the casing and the electrical contacts of the casing.

As can be seen in FIG. 6, the casing (2) comprises a slot (23) that extends in the longitudinal direction between the lower longitudinal end (21) and the upper longitudinal end (22) of said casing (2), and is configured to house a partial section of the flexible cable (11). The slot (23) in the first section (201) creates a wall (24), while in the second section (202) it partially passes through the wall of the casing. In accordance with what can be seen in FIG. 1, the pair of ceramic discs (4) are placed on the base (2) and the mobile cap (5) is placed thereon, thus defining a mobile cap height in the casing that corresponds to the height at which the mobile cap (5) is found with respect to the casing (2). Returning to FIG. 6, in the casing (2), and at the height of the mobile cap, two openings (251) (252) are defined that pass through the wall (24). Electrical contacts of the casing (261) (262) are respectively arranged in the openings (251) (252). In accordance with what can be seen in FIG. 6A, the elastic electrical contact (55) of the mobile cap (5) is configured to come into contact with the electrical contacts (261) (262) of the casing (2) by means of the movement of said mobile cap (5) caused by the actuation of the cam (7). As shall be described below, this configuration of the electrical contacts of the casing (261) (262), added to the electrical connection with the flexible cable (11), enables the determination of when a tap is open or closed, the smart monocontrol cartridge (1) being incorporated in said tap.

In addition, the monocontrol cartridge (1) of the invention comprises a casing cover element (27) configured to cover the slot (23), meaning that the partial section of the corresponding cable (11) is covered and protected by the casing cover (27), as seen in FIG. 1.

In accordance with what can be seen in FIGS. 2 and 7, the flexible cable (11) is, as its name indicates, flexible so as to be able to substantially adapt to the contour of the monocontrol cartridge (1) following the outer perimeter of the same, and is preferably flat so that a portion can be partially housed in the casing (2), as can be seen in FIG. 1. In particular, in accordance with FIG. 7, the flexible cable comprises a lower section (111), an intermediate section (112) and an upper section (113). The lower section (111) in turn comprises a lower end (111A) and a connection means (111B) for connecting to the electronic module (8), the latter sharing with the intermediate section (112) that in turn comprises a connection means (112B) for connecting to electrical contacts of the casing (261) (262); the upper section (113) has the connection means (112B) in common with the intermediate section (112) and in turn has an upper connection end (113B) wherein a connection socket (12) is arranged that is configured to receive the flexible cable (11) and to couple said flexible cable (11) to the cam (7).

In reality, the flexible cable (2) is a "flat array" or "flat tape" of cables that has a plurality of inner routes, as is known in the field of electronic components. In order to carry out the object of the invention, the flexible cable (2) internally comprises at least four inner routes that extend between the lower end (111A) and the upper connection end (113B), and at least two additional routes between the connection end (111B) for connecting to the electronic module (8) and the connection end (112B) for connecting to electrical contacts of the casing (261) (262). In accordance with the foregoing, the first four routes are configured as follows: two for electric power supply and neutral phase, and two for data communication or data bus, while the two additional routes are configured for electric power supply.

As may be seen in FIG. 7, and as has been stated above, the electronic module (8) comprises a connection port (82), said connection port (82) being configured to electrically connect and provide data communication between the electronic means and the flexible cable (11). Therefore, the electronic means are connected to at least 6 routes of the flexible cable (11). As such, the electronic means are electrically powered and can transmit the processed data and receive data through the data bus of the flexible cable.

Figure 6A:
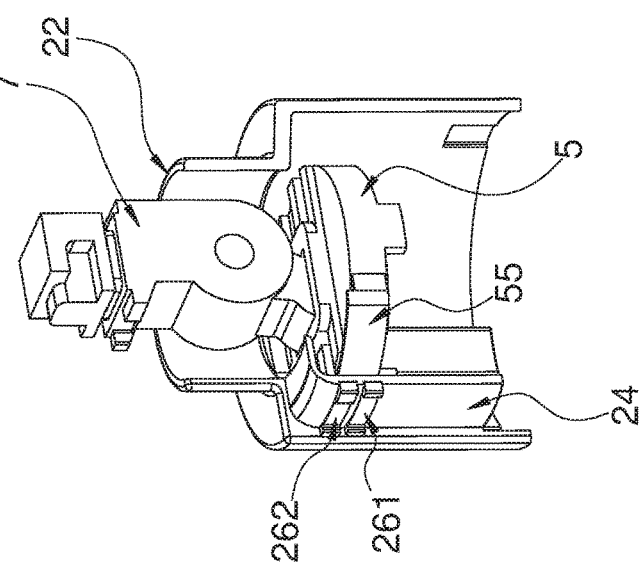
FIG. 6A is a perspective view wherein a partial cross section has been made in the casing in order to see the contact between the flexible electrical contact of the mobile cap and the electrical contacts of the casing.

The configuration of the electrical contacts of the casing (261) (262), added to the electrical connection with the flexible cable (11), enables the determination of when the cartridge (1) is open or closed to the passage of mixed water towards the outside of the same, that is, when said cartridge (1) is incorporated in a tap, it provides the ability to know when said tap is open or closed. In order to do this, the two additional routes of the flexible cable (11) arranged between the connection end (111B) for connecting to the electronic module (8) and the connection end (112B) for connecting to electrical contacts of the casing (261) (262), form a normally closed electrical circuit: the first of said two additional routes is connected between the connection port and the electrical contact of the casing (261), while the second additional route is connected to the electrical contact of the casing (262). In accordance with the connection to the electric power supply means, and the connection of the flexible cable (11) in the connection port (82), a voltage or potential difference can be established in one of said additional routes, while the other is taken as a digital input into the electronic means. Given that the electrical contacts of the casing (261) (262) are independent from each other, that is, they are not connected to each other, there must be an electrical contact between them in order to close the electrical circuit. To this end, it has the flexible electrical contact (55) of the mobile cap, which, as can be seen in FIGS. 6A and 7, is configured to simultaneously bring into contact the electrical contacts of the casing (261) (262) serving to close the electrical circuit. Therefore, and due to the potential difference established in the two additional routes, when the flexible electrical contact (55) is separated from the electrical contacts of the casing (261) (262), the electronic means record an open circuit data, while when the flexible electrical contact (55) is in contact with the electrical contacts of the casing (261) (262), the electronic means record a closed circuit data. These connection/disconnection positions of the flexible electrical contact (55) indicate the position of the mobile cap (5). Preferably, the open circuit data indicates that the cartridge enables the passage of mixed water towards the outside of the same, while the closed circuit data indicates that there is no passage of mixed water towards the outside of the cartridge. This must not be understood as limiting since the inverse configuration is also included within the scope of the invention.

As may be seen in FIGS. 1, 2 and 7, the flexible cable comprises an upper section (113) that has the connection end (112B) in common with the intermediate section (112) and which in turn has an upper connection end (113B) wherein a connection socket (12) is arranged that is configured to receive the flexible cable (11) and to couple said flexible cable (11) to the cam (7). The connection element (12) is connected to the upper end (72) of the cam (7) through coupling means. Based on FIGS. 7 and 8, said coupling means comprise a male-female connection, in order to carry out said male-female connection the upper connection element (12) has protrusions (121) and a cavity (122), wherein the protrusions (121) are configured to be housed in cavities (721) of the upper end (72) of the cam (7), while the cavity (122) is configured to receive a protrusion (722) of the upper end (72) of the cam (7).

In addition, and as can be seen in greater detail in FIG. 7A, the connection element (12) comprises a connection port (123) intended to electrically and mechanically link a connector (13) to the flexible cable (11). In this connection port (123), the inner routes of the flexible cable (11) have been configured so that they may share electric power supply and transmit and/or receive data towards and/or from an element that is external to the cartridge, but that may be connected to the same with the connector (13). In a preferred embodiment, the connection port (123) is a female-type connector, while the connector (13) is a male-type pin connector. These types of connections are widely known within the field of electronics, which means that the person skilled in the art would understand that any type of connection that enables the flexible cable (11) to be connected to an element exterior to the cartridge would fall within the scope of the invention.

In alternative embodiments, the flexible cable (11) comprises at the lower end (111A) of the lower section (111) a connection element (14) (not shown) that is configured to receive said flexible cable (11) and to electrically couple said flexible cable to a connector (15) (not shown). The connection to this connector (15) is carried out similarly to the connection between the connector (13) and the connection socket (12) described above.

In other alternative embodiments, the electronic means are prepared to wirelessly transmit and/or receive data to and/or from an element that is external to the cartridge.

Moreover, and in accordance with the foregoing and as may be seen in FIG. 8, the cam (7) comprises a lower end (71) configured to be coupled to the cavity (54) of the mobile cap (5), wherein when the cam (7) is actuated, it moves the mobile cap (5), which in turn causes a relative movement between the electrical contacts of the casing (261) (262) and the elastic contact (55).

FIG. 9 shows a detail of the handle (6), which comprises a projection (61) configured to rest against the shoulder (203) of the casing (2), a longitudinal section (63), a cavity (64) in which the cam (7) is located, which is coupled in a pivotable way to the handle (6) by means of a pin (60) (not shown) that passes through said cam (7) through a hole (73), said pin (60) being fastened in holes (65) arranged in the handle (6). In addition, the handle has, in the longitudinal section (63), a recess (631) configured so that a portion of the upper section (113) of the flexible cable (11) rests and is housed at least partially in said recess (631). The purpose of this recess (631) is for the flexible cable (11) to be completely contained within the measurements of a standard monocontrol mixing cartridge so that it can be used in any common monocontrol tap on the market.

In previous sections it has been mentioned that the smart monocontrol cartridge (1) of the present invention can be arranged in any monocontrol-type tap and operate as a common mechanical monocontrol cartridge on the market; however, the smart monocontrol cartridge (1), as has been described above, is preferably conceived to be incorporated in a smart monocontrol tap that controls the flow of a mix of hot water and cold water, in accordance with what can be seen in FIG. 10, said tap comprising a tap body (not shown) comprising a base end (not shown), an upper end (not shown), a projection (not shown) wherein a mixed water outlet end is defined and a cartridge housing (not shown), the monocontrol cartridge (1) being arranged in the cartridge housing and configured to receive a flow of cold water through the cold water channel (31) of the base (3) and a flow of hot water through the hot water channel (32) of the base (3); a handle (100) arranged at the upper end of the tap body and operatively coupled to the monocontrol cartridge (1); and electricity supply means (not shown) configured to power the electronic means (10) and the indirect temperature detection means (9) of the monocontrol cartridge (1).

It is clarified that in FIG. 10, the handle (100) is seen with a partial cross section or cut out in order to be able to see the coupling of said handle (100) to the monocontrol cartridge (1). As may be seen in the aforementioned FIG. 10, the handle (100) comprises a housing (1001) wherein an interface element (1002) is arranged, the interface element (1002) being electromechanically connected to the connector (13) which, as has been stated above, is connected to the flexible cable (11) by means of the connection with the connection socket (12). As such, an electrical and data connection is established through the flexible cable (11) between the electronic module (8) and the interface element (1001).

Likewise, the handle (100) comprises coupling means (1003) configured to couple said handle (100) to the upper end (72) of the cam (7) and to transmit the movement of the handle (100) towards the cam (7), as can be seen in FIG. 10, wherein, similarly to the handle (100), the coupling element (1003) is shown in a partial cut out view. In the embodiment of the FIG. 10, the coupling means (1003) are shaped as a sleeve suitable recessed to house the upper end (72) of the cam (7). The movement of the handle (100) corresponds to the normal actions to open, close and regulate the temperature of the mixed water.

The electricity supply means, which are preferably connected at the end (111A) of the lower section (111) of the flexible cable, power the electronic means (10), the indirect temperature detection means (9) of the monocontrol cartridge (1) and also power the interface element (1002) through the flexible cable (11). In preferred embodiments, the electricity supply means comprise one selected from a battery, supply from the normal electrical grid, photovoltaic cells, and similar, or combinations thereof.

The interface element (1002) preferably comprises visual means that, according to the particular application of each tap, are selected from LEDs, LED display, LCDs or similar. As shall be described below, the type of visual means of the interface can vary depending on the data selected to be informatively shown through the interface element (1002).

When the smart monocontrol cartridge (1) is incorporated in a tap such as the one described until now, a series of functional advantages can be obtained, such as:

Calculation in real time of the real temperature detected in the mixed water channel (33). A constant data collection process is carried out by the indirect temperature detection means (9). This process is carried out through the electronic means (10) that calculate, using the processing means, the real temperature of the mixed water based on the indirect detection of temperature. An electronic filtering system of the temperature measurement is added into this process, due to the fact that the stable and final temperature of the mixed water is not instantaneous, since a period of time for thermal homogenisation is required when hot and cold water is mixed in the mixed water channel (33). The calculated real temperature of the water is sent to the interface element (1002) through the communication means of the electronic means (10). In this way, a user of the tap can visualise, whether through a digit or a colour code, the temperature and adjust it with the handle (100) to their preferences.

Position control of the handle (100) of the tap (ON/OFF). This function is obtained through the electrical signal sent by the connection/disconnection function of the flexible electrical contact (55) and the electrical contacts of the casing (261) (262). When the handle (100) is actuated, it moves, through the cam (7), the mobile cap (5) that is involved in the connection/disconnection of the flexible electrical contact (55) and the electrical contacts of the casing (261) (262). The electrical signal produced by said connection/disconnection is sent to the electronic means (10) in order for the processing to determine whether or not there is passage of water towards the outside of the cartridge (1) and therefore, whether the tap is open or closed. The signal of whether the tap is open or closed is sent to the interface element (1002) through the communication means of the electronic means (10). In this way, a user of the tap can visualise, whether through a digit, an icon or a colour code, the open state of the tap.

The tap can have additional or preferred functions related to the control and actuation of the configured processes, scenarios, warnings and alarms, such as:

ECO/MEMO: the electronic means can have a pre-set reference time stored in a buffer, or in a read and write memory, in which a usage time interval which is defined as suitable for the tap to be open is defined. When the tap is opened, the electronic means count the usage time of the tap. In the event that the actual usage time of the tap exceeds the pre-set reference time value, an overuse indication signal is sent through the communication means of the electronic means to the interface element (1002). In this way, a user of the tap can visualise, whether through a digit, an icon or a colour code, an overuse warning or alarm.

Prevention of Legionella: When the tap is closed, the time that the tap is closed is counted in the electronic means (10). In the event that the tap remains closed for at least 7 days, the processing means generate a signal that is sent to the interface element (1002) through communication means of the electronic means (10) that recommends that cleaning should be carried out to prevent Legionella. This warning can be visualised, whether through a digit, an icon or a colour code, in the interface element (1002). The warning can be temporarily active or fixed until the preventative cleaning is carried out.

Anti-scalding: this function aims to determine whether the mixed water in the mixed water channel (33), released from the tap, has reached value that can be harmful to the user. As has been defined above, when the processing means of the electronic means (10) have calculated the real temperature $T_R$ of the mixed water, it is then compared to a reference temperature $T_{Ref}$ stored in an internal memory of the processing means. The reference temperature $T_{Ref}$ corresponds to the temperature that can scald skin, that is, the temperature at which hot water can burn the skin of the user, which according to medical standards is above 50° C., that is, when this temperature value is reached, there is a high risk of burning for the user. Therefore, the aim of the comparison is to detect when the temperature of the mixed water in the mixed water channel (33) is close to, has reached or has exceeded the reference temperature $T_{Ref}$ that corresponds to the scalding temperature, and generate the corresponding data that is sent to the interface element (1002) through the communication means of the electronic means (10). In this way, a user of the tap can visualise, whether through a digit or a colour code, the temperature and adjust it with the handle (100) such that the user can regulate the flow of cold water to reduce the temperature of the water and bring it to below the scalding temperature.

In a first preferred embodiment of the tap, the interface element (1002) is arranged in the handle (100) of a monocontrol tap; however, in other embodiments, the interface element (1002) is arranged in other parts of the tap body or outside the body of the tap, but being able to carry out all the operations described in said first preferred embodiment, given that the electronics of the monocontrol cartridge (I) are independent from the position of the interface.

The smart monocontrol cartridge (1) of the present invention, being incorporated in a tap as has been described, can form part of a smart management system, such as a home automation system, in which the element that forms part of the same exchange information in order to manage different points of interest, such as the regulation of the outlet of mixed water in a tap. In this point it is noted that, as has been mentioned on previous pages, at least two of the inner routes of the flexible cable (11) correspond to a data bus. Therefore, said flexible cable (11) can be electrically and mechanically connected by means of a connector (not shown), preferably by the lower end (111A), such that it bidirectionally shares the data generated and obtained by the electronic means with a computerised infrastructure management system such as a Building Management System, or home management systems, such as home automation systems or APPs. In this way, the infrastructure management system would be able to know the state of each tap by means of data exchange through the data bus of the electronic cartridge installed inside the tap. In this way, the infrastructure management system could order actions to the electronic cartridge by sending data through the data bus of the electronic means of the electronic cartridge. An example of this would be that the infrastructure management system detects a water leak in a supply pipe, for example by means of a flowmeter (500), and sends the information to the electronic cartridges in order to visualise in the interface element (1000) an alarm associated with this event. In addition, the smart monocontrol cartridge (1), after detecting the scalding temperature, can send a signal to a solenoid valve (400) that forms part of the computerised infrastructure management system so that the solenoid valve cuts the water supply towards the tap provided with the cartridge that has sent the warning signal.

The invention has been sufficiently described but a person skilled in the art shall see that other advantages and operations can be obtained and form part of the claimed invention.

What is claimed is:

1. A smart monocontrol cartridge (1) for taps comprising:
    a casing (2) comprising a lower longitudinal end (21) and an upper longitudinal end (22), and which houses therein:
    a base (3) coupled to the lower longitudinal end (21) of the casing (2), the base (3) comprising at least three perforations that respectively define a channel for cold water (31), a channel for hot water (32) and a channel for mixed water (33);
    a pair of ceramic discs (4), the lower being fixed (41) and the upper being mobile (42), located above the base (3), the lower fixed ceramic disc (41) being coupled to the base (3);
    a mobile cap (5) arranged above the pair of ceramic discs (4), coupled to the upper mobile ceramic disc (42) and configured to move with respect to the casing (2), the mobile cap (5) comprising an elastic electrical contact (55);
    a handle (6) arranged above the mobile cap (5) and coupled with respect to the upper longitudinal end (22) of the casing (2);
    a mobile cam (7) coupled in a pivotable way to the handle (6) and operatively connected to the mobile cap (5) and configured to move said mobile cap (5);
    wherein the smart monocontrol cartridge (1) further comprises:
    a slot (23) that extends in a longitudinal direction between the lower longitudinal end (21) and the upper longitudinal end (22) of the casing (2), wherein electrical contacts of the casing (261) (262) are arranged in the slot (23) at the height of the mobile cap (5), wherein the elastic electrical contact (55) of the mobile cap (5) is configured to be put in contact with the electrical contacts of the casing (261) (262) by movement of the mobile cap (5) generating an electrical sign of the position of the mobile cap (5) based on the contact between the electrical contacts of the casing (261) (262) and the elastic electrical contact (55); and
    a flexible cable (11) coupled to the mobile cam (7) and to the electrical contacts of the casing (261) (262), the flexible cable (11) comprising a plurality of routes configured for the electric power supply and data communication;
    wherein the base (3) comprises a lower end (34), an upper end (35) for coupling to the pair of ceramic discs (4) and an intermediate portion (36) in which a recess (3R) is defined in which an electronic module (8) is configured to detect a temperature in the mixed water channel (33) and to house a processing module (10), which receives a data communication indicative of indirect temperature detection, wherein the processing module is configured to calculate real temperature in the mixed water channel (33) based on an indirect temperature detected in the mixed water channel (33) and compare said real temperature to a pre-set reference temperature;
    wherein the electronic module (8) is coupled to the flexible cable (11); and
    wherein the electronic module (8) is configured to identify the position of the mobile cap (5) based on the electric signal sent through the flexible cable (11) to the processing module (10) of the electronic module (8).

2. The monocontrol cartridge (1) according to claim 1, wherein in the intermediate portion (36) of the base (3), the perforation of the channel for cold water (33) generates in the recess (3R) a channel wall (3R1) for mixed water (33).

3. The monocontrol cartridge (1) according to claim 1, wherein the electronic module (8) comprises an inner wall (8R1) configured to be put in operative contact with the wall (3R1) of the channel for mixed water (33).

4. The monocontrol cartridge (1) according to claim 1, wherein the electronic module (8) comprises an inner cavity (81) configured to house the processing module (10), wherein an indirect temperature detection is performed in the inner wall (8R1) of the electronic module (8).

5. The monocontrol cartridge (1) according to claim 1, wherein the electronic module (8) comprises a connection port (82), wherein said connection port is configured to electrically connect the processing module (10) to the flexible cable (11) and establish data communication therebetween.

6. The monocontrol cartridge (1) according to claim 1, wherein the mobile cap (5) comprises attachment means (53) configured to couple said mobile cap (5) to the mobile upper disc (42) of the pair of ceramic discs (4).

7. The monocontrol cartridge (1) according to claim 1, wherein the flexible cable (11) comprises a lower section (111), an intermediate section (112) and an upper section (113), wherein the lower section (111) and the intermediate section (112) are connected, and wherein electrical contacts of the casing (261) (262) are used to connect between the intermediate section (112) and the supper section (113), and wherein there is a connection element (12) in the upper section (113) configured to receive the flexible cable (11) and to couple said flexible cable (11) to the cam (7).

8. The monocontrol cartridge (1) according to claim 4, wherein the cam (7) is coupled in a pivotable way to the handle (6) by a bolt (60) that passes through said cam (7) through a hole (73), said bolt (60) being fastened in holes (65) arranged in the handle (6), the pivoting movement of the cam (7) being configured to move the mobile cap (5), which in turn generates a relative movement between the electrical contacts of the casing (261) (262) and the elastic electrical contact (55) of the mobile cap (5).

9. The monocontrol cartridge (1) according to claim 8, wherein the cam comprises a lower end (71) configured to be operatively coupled to the mobile cap (5) and an upper end (72) configured to actuate said cam (7), wherein said upper end (72) of the cam (7) comprises coupling means configured to couple a connection element (12) that connects the upper end (113B) of the flexible cable (11), the connection element (12) comprising a connector (13) electrically linked to the flexible cable (11).

10. The monocontrol cartridge (1) according to claim 4, wherein the flexible cable (11), at the lower end, is configured to be electro-mechanically coupled to a connector (15).

11. A monocontrol tap wherein it comprises a smart monocontrol cartridge (1) according to claim 1.

12. A smart monocontrol tap that controls the flow of a mix of hot water and cold water, wherein it comprises:
    a tap body comprising a base end, an upper end, a projection in which a mixed water outlet end is defined and a cartridge housing;
    the smart monocontrol cartridge (1) according to claim 1 arranged in the cartridge housing and configured to receive a flow of cold water through the cold water channel (31) of the base (3) and a flow of hot water through the hot water channel (32) of the base (3);
    a handle (100) arranged at the upper end of the tap body and operatively coupled to the monocontrol cartridge (1), the handle (100) comprising:
        a housing (1001) wherein an interface element (1002) is arranged, the interface element (1002) being electromechanically connected to the flexible cable (11) through a connector (13) connected in turn to a connection element (12) of the monocontrol cartridge;
        a coupling element (1003) configured to couple the upper end (72) of the cam (7) of the monocontrol cartridge (1), the handle (100) being configured to actuate the cam (7);
    and
    electricity supply configured to provide energy to the processing module (10) and to the interface element (1002).

13. The smart monocontrol tap according to claim 12, wherein the processing module is configured to calculate, based on the position of the mobile cap (5), the position of the handle (100) and the opening and/or closing time of the handle (100).

14. The monocontrol tap according to claim 12, wherein the flexible cable (11) of the cartridge is used to transmit to the interface element (1002) information of the calculation of the real temperature in the mixed water channel (33), and/or of the calculation of the comparison between the calculated real temperature and pre-set reference temperature, and/or of the position of the handle (100), and/or of the opening and/or closing time of the handle (100), wherein the interface element (1002) is configured to show the information received by therein.

15. A smart monocontrol tap that controls the flow of a mix of hot water and cold water, wherein it comprises:
    a tap body comprising a cartridge housing;
    a mixed water outlet body;
    the smart monocontrol cartridge (1) according to claim 1 arranged in the cartridge housing and configured to receive a flow of cold water through the cold water channel (31) of the base (3) and a flow of hot water through the hot water channel (32) of the base (3);
    a handle operatively coupled to the cartridge, and comprising a coupling element configured to be coupled to the upper end (72) of the cam (7) of the monocontrol cartridge (1);
    an interface element in electro-mechanical and data connection with the monocontrol cartridge (1), said visual interface element being configured to display information data from the processing module (10); and
    electricity supply means configured to provide energy to the processing module (10) and the interface element.

16. The smart monocontrol tap according to claim 15, wherein the interface element is arranged in a position along the tap body, and/or along the mixed water outlet body, and/or in a position external to the tap body and to the mixed water outlet body.

17. The smart monocontrol tap according to claim 15, wherein the interface element is electro-mechanically connected to and in data connection with the flexible cable (11) through the connector of a lower connection element of the flexible cable (11) of the monocontrol cartridge.

18. The smart monocontrol tap according to claim 15, wherein the processing module is configured to calculate, based on the position of the mobile cap (5), the position of the handle and the opening and/or closing time of the handle.

19. The smart monocontrol tap according to claim 15, wherein the flexible cable (11) of the monocontrol cartridge (1) is used to transmit to the interface element information of the calculation of the real temperature in the mixed water channel, and/or of the calculation of the comparison between the calculated real temperature and pre-set reference temperature, and/or of the position of the handle, and/or of the opening and/or closing time of the handle, wherein the interface element is configured to show the information received by therein.

20. A smart management delivery system of mixed hot water and cold water wherein it comprises:
the smart monocontrol tap of claim 12 intended to be supplied by a hot water pipe and a cold water pipe;
a shutoff solenoid valve intended to be connected to the hot water pipes and/or to the cold water pipes upstream with respect to the monocontrol tap, the solenoid valve being configured to emit an operation signal and receive a cut-off signal
a flowmeter intended to be arranged downstream of the cut-off solenoid valve and upstream of the tap, the flowmeter being configured to emit a flow signal
wherein the cartridge is configured to receive a flow signal, receive an operation signal and transmit a cut-off signal.

* * * * *